United States Patent [19]

Resnick

[11] Patent Number: 4,618,157
[45] Date of Patent: Oct. 21, 1986

[54] BEACH HAND CART

[76] Inventor: Sharon H. Resnick, 3912 Lake Front Cir. #102, Virginia Beach, Va. 23452

[21] Appl. No.: 761,436

[22] Filed: Aug. 1, 1985

[51] Int. Cl.$^4$ .............................................. B62B 13/18
[52] U.S. Cl. ...................................... 280/8; 280/43.1; 280/47.24; 280/655
[58] Field of Search .................. 280/11, 11 BT, 43.12, 280/43.14, 43.24, 47.18, 47.24, 47.26, 47.27, 47.28, 47.33, 47.37 R, 655, 8, 9, 10, 47.21, 43.1

[56] References Cited

U.S. PATENT DOCUMENTS

| | | | |
|---|---|---|---|
| 3,046,031 | 7/1962 | Reynolds | 280/47.24 |
| 3,336,040 | 8/1967 | Hermanns | 280/43.1 |
| 3,927,894 | 12/1975 | Zawislak | 280/47.26 |
| 4,021,052 | 5/1977 | Knowles | 280/11.1 BT |
| 4,291,891 | 9/1981 | Blanchette | 280/43.24 |
| 4,316,615 | 2/1982 | Willette | 280/47.26 |
| 4,523,774 | 6/1985 | Pickerson | 280/47.24 |

Primary Examiner—John J. Love
Assistant Examiner—Richard M. Camby

[57] ABSTRACT

Manually operated collapsible hand truck for carrying supplies to and from and across beach has wheels independently mounted on raised front tips of skis. Skis are rigidly attached to base of hand cart. Nominally upright frame is pivotably connected to front of cart base. Hand cart frame is locked into position relative to the base by moveable locking pin and entire hand cart may be tilted for rolling across hard pavement.

Hand cart frame is temporarily unlocked from base for sliding transport of hand cart upon skis across soft sand.

9 Claims, 9 Drawing Figures

BEACH HAND CART

FIELD OF INVENTION

The present invention relates to hand trucks. In particular, the present invention relates to hand trucks adapted for use on both solid pavement and on soft sand.

BACKGROUND

A problem that is often encountered by beach-goers is the task of transporting several awkward and heavy itmes, such as ice chests and chairs, from their automobiles across great distances to the sand. Upon reaching the beach's sand, the beach-goer still has the often difficult task of carrying these goods over the sand to a suitable location on the beach.

Various hand trucks, such as collapsible luggage carts, are known which provide a relatively easy means of transporting packaged goods across paved surfaces. A problem of such devices is that they are generally only suitable for use on smooth hard pavements and are quite ineffective over sand.

Some prior devices (eg. U.S. Pat. No. 4,316,615) employ wide wheels attached to the underside of carts. Although the use of wide wheels makes it less difficult to drag such carts across sand than standard size luggage cart wheels, such devices are still quite difficult to pull over soft sand, as the wheels invariably get bogged down in the sand. Additionally, such prior devices are inherently bulky—owing to the large wheels and their associated mounting apparatus—and are heavy and cannot be easily collapsed into a small package when not in use.

Other prior devices (eg. U.S. Pat. No. 3,046,031) comprise rigid curved backed drags which are provided with fixed wheels or rollers. A problem of these devices is that they cannot be easily collapsed or stored when not in use. Another problem of such devices is that it is very difficult to center the load over the wheels when the device is being pulled across smooth pavement. Another problem of such devices is that, because the angle and the position of the wheels relative to the "handle" is fixed, the height at which the "handle" is held above the ground dictates the mode of the device—that is, whether the wheels or the drag are against the ground. Accordingly, such devices are awkward to operate by anyone whose height doesn't "fit" the device.

A still further problem of such prior devices is that the height at which the "handle" is pulled while in the drag mode necessarily cannot be the same height at which the "handle" is pulled while the device is in the rolling mode.

OBJECTS

Accordingly, it is an object of the present invention to provide a hand truck particularly adapted for use over both smooth hard pavement and over sand.

It is another object of the present invention to provide a hand truck of the character described which can be easily collapsed for storage when not in use.

It is another object of the present invention to provide a device of the character described that has wheels upon which the device may be rolled across smooth pavement, and has one or more skis upon which the device may be slid over sand.

It is another object of the present invention to provide a device of the character described in which the load can be centered over the wheels when the device is being used over smooth pavement.

It is a further object of the present invention to provide a device of the character described in which the load may be centered over its ski(s) when the device is being pulled over sand.

It is a further object of the present invention to provide a device of the character described which is equally suited to be pulled by persons of different heights.

It is a still further object of the present invention to provide a device of the character described in which the height at which the pulling handle of the device is held can be the same in both the rolling and sliding modes of the device.

These and further objects and advantages of the present invention will become better understood by those skilled in the art by reference to the drawings and ensuing description thereof.

DRAWINGS

DESCRIPTION

Figure 1:
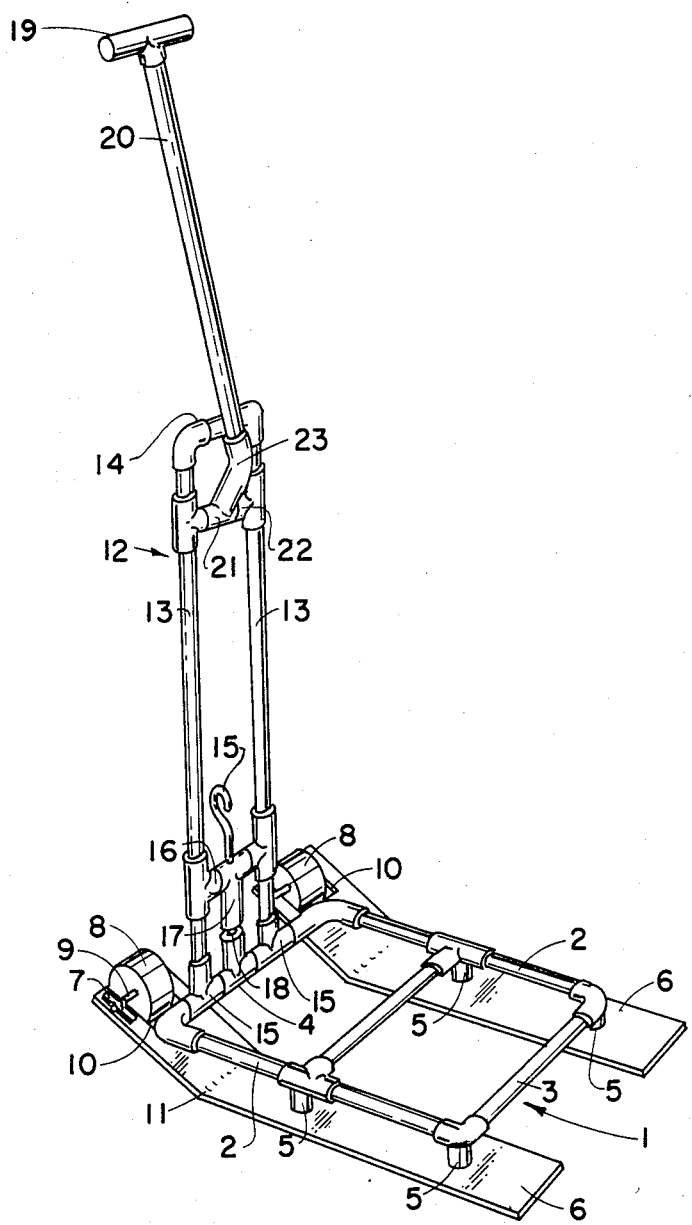
FIG. 1 is a perspective view of the present invention.

In the preferred embodiment of the invention as illustrated in FIG. 1, the device is provided with a base, generally designated (1), having corresponding parallel side bars (2) a rear bar (3) and front bar (4). Base (1) is provided with spacer blocks (5) to which corresponding parallel skis (6) are mounted on the underside of the base (1).

Skis (6) are provided with wheel mounting hardware (7) by which means one wheel (8) is independently mounted on the rear end of each ski (6). In the preferred embodiment of the invention, wheel mounting hardware (7) secures wheel axle (9) to front end of ski (6) which is notched (10) at its end to provide clearance for free rotation of the wheel (8).

Figure 4:
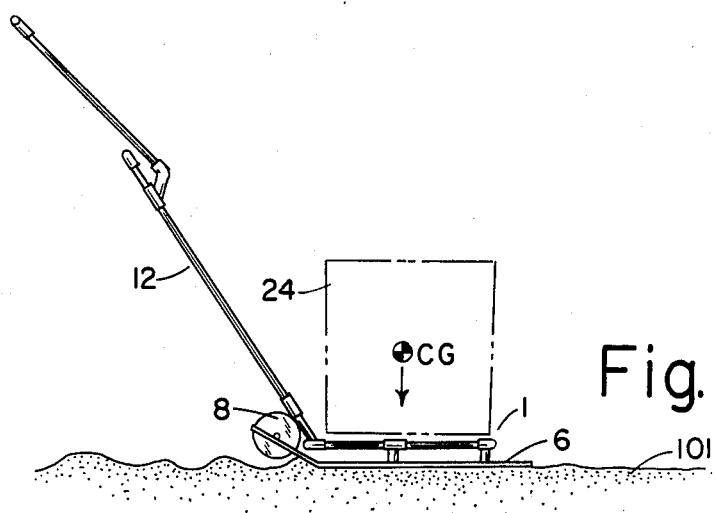
FIG. 4 is a side elevation of the invention with a load applied thereto and showing the device in use on soft sand.

Ski (6) is generally flat and parallel to the plane of the base (1) from the rear bar (3) approximately to the front bar (4) at which point the ski (6) is bent (11) upwards at a sufficient angle to raise the bottom of wheel (8) above the bottom of ski (6) when ski (6) is against the ground as shown in FIG. 4.

Frame (12) has corresponding parallel side bars (13) and a top bar (14) which together form a plane with base front bar (4). Side bars (13) are attached to collars (15) which encircle, and freely rotated about, base front bar (4).

A lower cross bar (16), attached to frame side bars (13) has a pin housing (17) and a spring loaded locking bolt (15). A mortise (18) is provided in base front bar (4) into which locking pin (15) may be inserted when frame (12) is oriented at approximately 90 degrees relative to the plane of base (1).

A handle (19) is attached at one end of handle stem (20). The opposite end of the handle stem (20) is attached to a collar (21) which encircles, and freely rotates about, upper cross bar (22). Base of handle stem (20) is offset (23) as necessary for handle stem to extend from top of frame (12) and approximately parallel to frame side bars (13) without intersecting frame top bar (14).

In the preferred embodiment of the invention the skis (6), base (1), frame (12) and handle (19) are all constructed of plastic. However, any common materials of construction may be used in their place, including fiberglass and metals.

OPERATION

Figure 3:
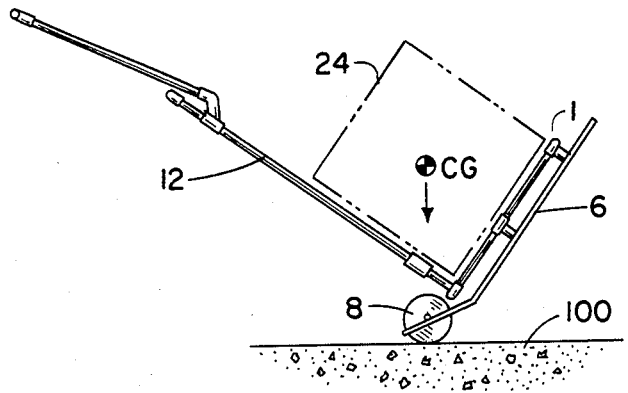
FIG. 3 is a side elevation of the invention with a load applied thereto and showing the device in use on hard pavement.

Referring to FIGS. 1 and 3: When used to carry a load (24) across smooth pavement, frame (12) is locked into position relative to base (1) by spring loaded locking pin (15) which passes through pin housing (17) (which is fixed relative to frame (12)) and mortise (18) (which is fixed relative to base (1)).

With the position of the frame (12) relative to the base (1) fixed, the entire device may be tilted back as shown in FIG. 3 so that wheels (8) roll against the ground (100) and skis (6) are raised above the ground. By adjusting the angle of tilt of the invention, the load may be balanced so that the center of gravity (CG) of the load (24) is directly above the wheels. By manually pulling handle (19) the invention and the load (24) can be easily rolled across a smooth pavement (100).

Figure 2:
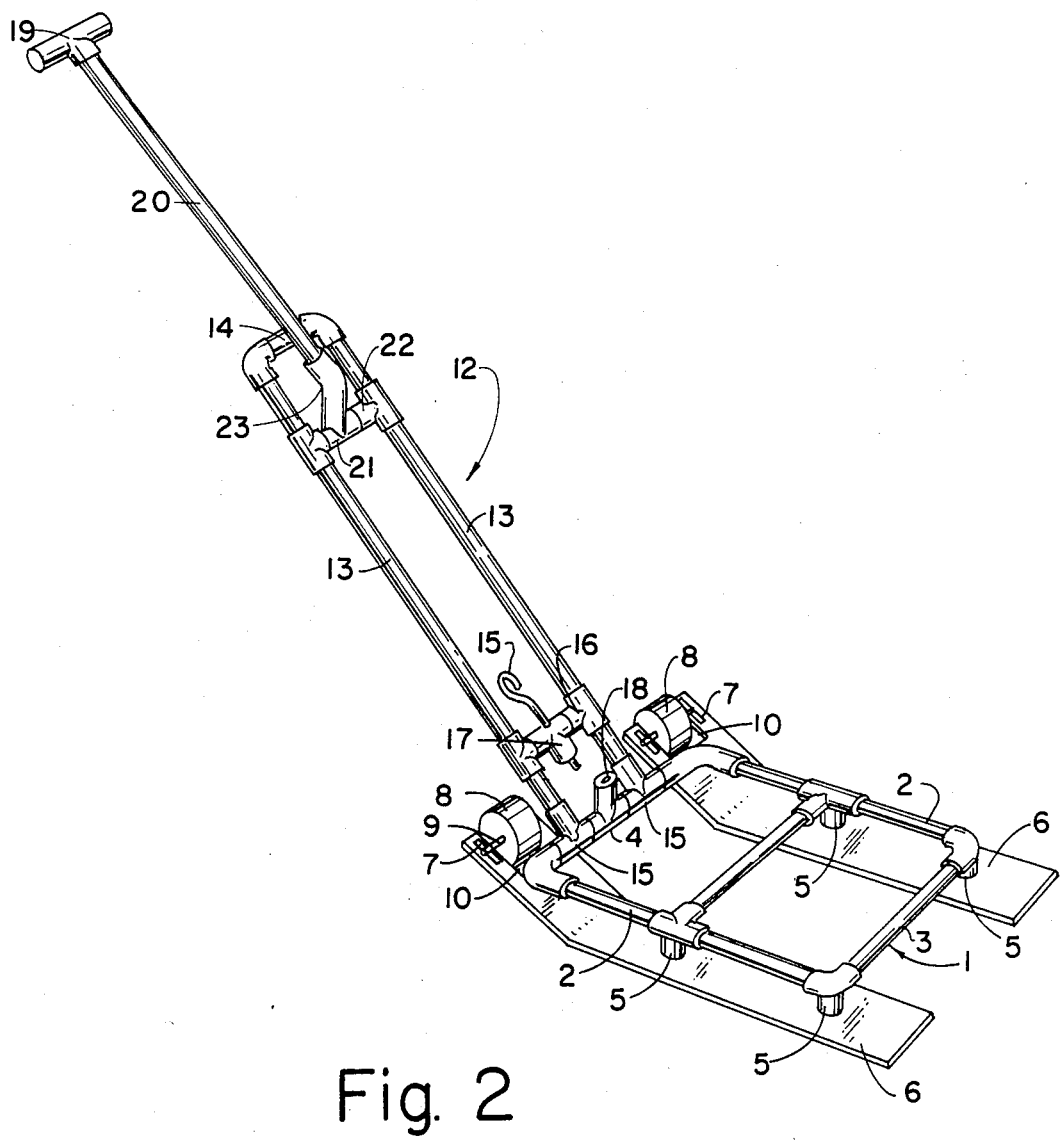
FIG. 2 is a perspective view of the present invention with back frame unlocked from the base.

Referring to FIGS. 2 and 4:

When it is desirable to use the present invention on sand (101), spring loaded locking pin (15) is manually disengaged from mortise (18) thereby allowing frame (12) to freely rotate about base front bar (4). In this mode skis (6) lie flat against the sand (101) and distribute the weight of the load over the surface area of the bottom of the skis (6).

With the flat area of the skis (6) against the sand (101), wheels (8) are raised up so that the bottom of the wheels (8) are above the bottom of the skis (6). The distance from the bottom of the wheels (8) to the ground can be increased by constructing the device with a large angle of the bend (11) in the skis, or with an extended distance from the bend (11) to the axle (9) or by decreasing the diameter of the wheels (8). However, in the preferred embodiment of the invention, the bottom of the wheels are positioned only slightly (i.e. less than an inch) above the plane of the bottom of the skis (6), as it has been determined that the bottom of the rotatable wheels do not introduce significant friction forces against the sand when the skis (6) are sliding across the sand (101).

In addition to supporting the wheels (8) out of the sand, the bent tips (11) of the skis (6) also help smooth out bumps in the sand as the device is being pulled across the sand.

It will be appreciated by those skilled in the art that when the invention is used in this mode, as shown in FIGS. 2 and 4, the load (24) may be centered over the base (1) and its weight distributed evenly over the underside of the skis (6), indpendent of the angle of tilt of the frame (12). It will therefore be appreciated that, when pulling the device over sand, there is no inherently preferred angle of pull or height at which the handle (19) must be held above the sand.

Figure 5:
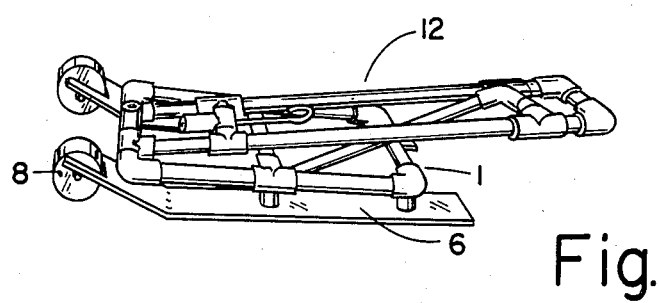
FIG. 5 is a perspective view of the present invention in the collapsed mode.
Figure 6:
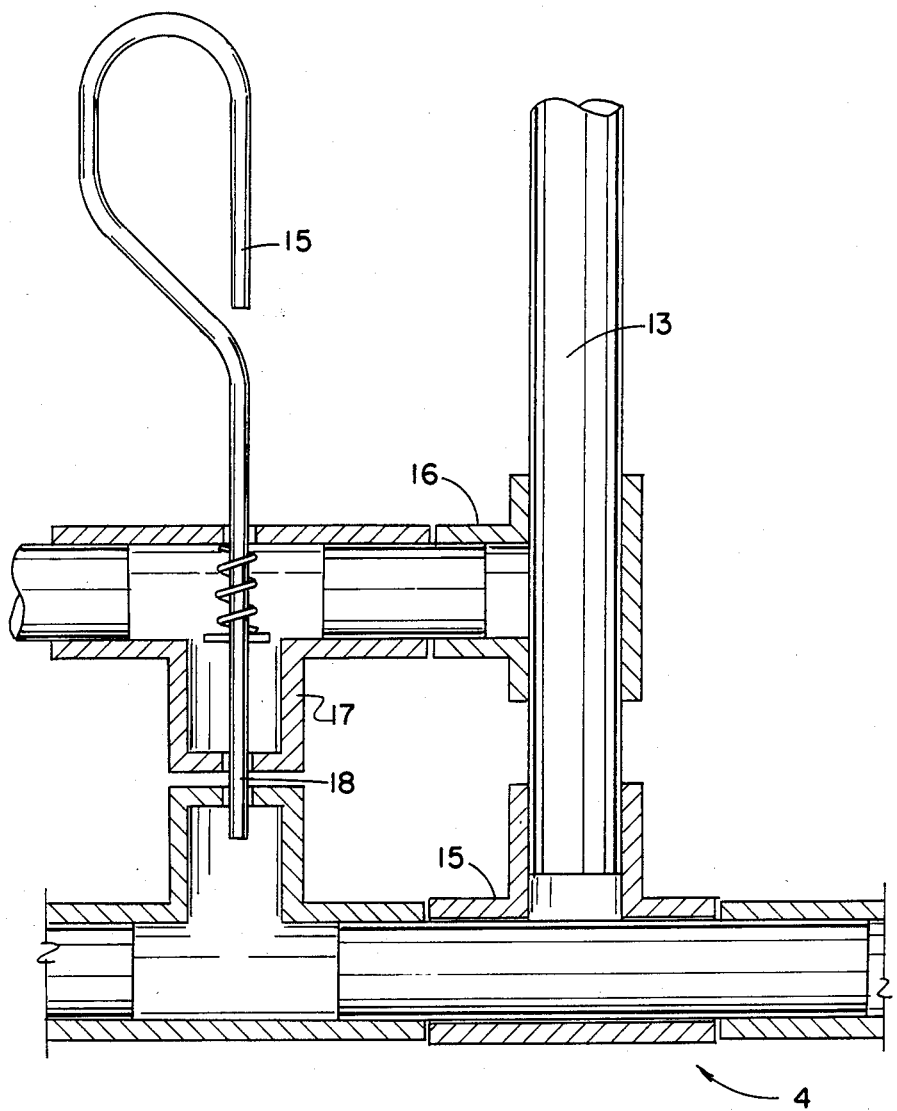
FIG. 6 is a partial cross-sectional view showing construction of the pin lock mechanism and means of attaching back frame to rear of base.

When not in use the device may be collapsed as shown in FIG. 5, for easy carrying and storage.

Figure 7:
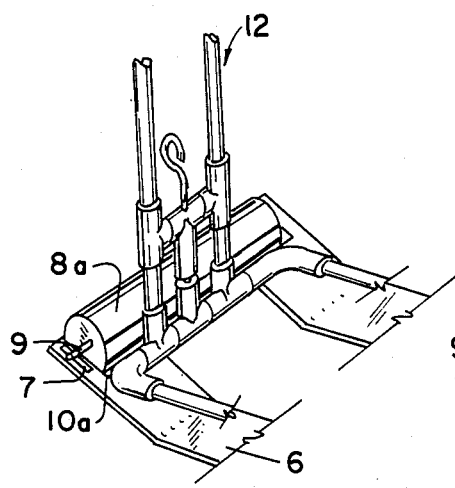
FIG. 7 is a partial perspective view of the present invention showing a single-wheel modification of the device.

In the preferred embodiment of the invention, wheels (8) are independently mounted on the ends of skis (6). The wheel axles (9) may be secured to either the top of the skis (6) as shown in FIGS. 1, 2, 3 and 4; or they may be mounted to the underside of the skis as shown in FIG. 5. In one variation of the present invention, a single continuous wheel (8a) extends between the two skis (6) as shown in FIG. 7. In this modification of the invention skis (6) are notched (10a) through to the inside of each of the skis to allow for the single wheel.

Figure 8:
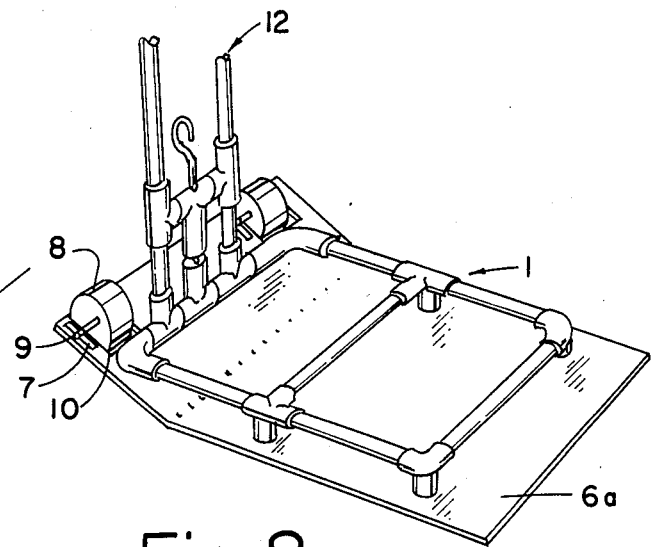
FIG. 8 is a partial perspective view of the present invention showing a single-ski modification of the device.

Two skis (6) are shown in the preferred embodiment of the invention. In another variation of the invention, skis (6) may be replaced by a single wide ski (6a) as shown in FIG. 8.

Figure 9:
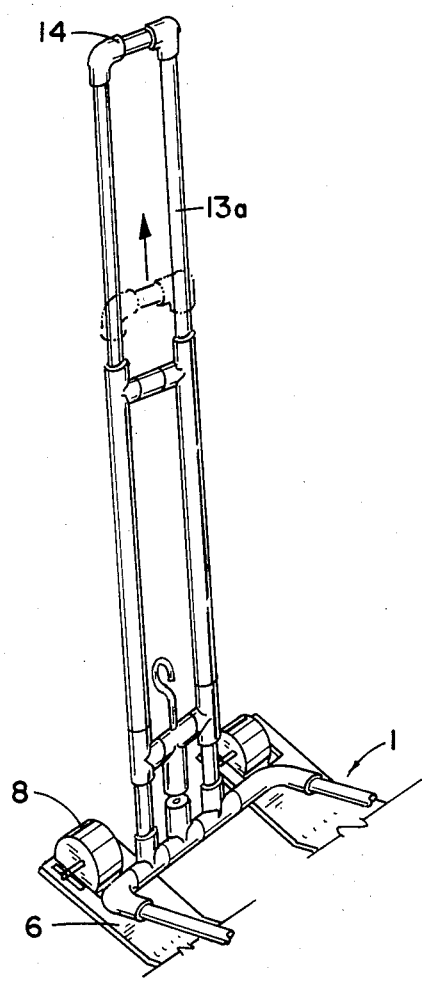
FIG. 9 is a partial perspective view of the present invention showing a telescopic back frame modification of the device.

While the above description contains specificities, these should not be construed as limitations on the scope of the invention, but rather as an exemplification of one preferred embodiment thereof. Many variations are possible, for example: In place of the spring-loaded locking pin (15), other known fasteners including threaded fittings, hasp-type locks, straps, etc. can be used to temporarily fix the position of the base (1) relative to the frame (12); locking pins, hooks, straps, etc. can be incorporated with frame (12) in order to fix handle stem (20) in extended position; more than one handle stem (20) can be used to secure handle (19) to frame (12); wheels (8) may be mounted upon a single continuous axle extending between the wheels; the opposite sides of base structure (1) can be non parallel; the opposite sides of frame (12) can be non-parallel; the plane of base (1) and skis (6) can be non-parallel; the top of frame (14) may be used to pull the device and the handle (19) and handle stem (20) may be deleted and in the absense of handle (19) and handle stem (20), frame side bars (13) may be of telescopic construction as shown in FIG. 9; and frame (12) may be attached to base (1) by hinge.

Accordingly, the scope of the invention should be determined not by the embodiment illustrated, but by the appended claims and their legal equivalents.

I claim:

1. A manually operated hand cart comprising:
   two or more skis;
      each of said skis having a nominally smooth underside; the rear end of said underside of said ski being in a first plane; and
      the front end of said underside of said ski being at an acute angle to said first plane;
   one or more wheels;
      each of said wheels being rotatably mounted onto said front end of said skis;
   a base structure rigidly attached to the top of said skis;
      said base structure having a front end and a rear end corresponding to said front end and said rear end of said skis, respectively;
   a frame having a top end and a bottom end;

said frame being rotatably mounted to said front end of said base structure at said bottom end of said frame;

a handle means in communication with said top end of said frame by which handle means the hand cart may be pulled; and locking means by which the position of said frame relative to said base structure may be temporarily fixed in the upright position.

2. The invention according to claim 1 in which said skis are elongated members and said skis are parallel to each other.

3. The invention according to claim 2, further comprising:

mounting means by which each of said wheels is rotatably mounted onto each of said skis, respectively;

said mounting means comprising an axle and an axle mounting member by which means said axle is secured to said ski; and an opening in the front of said ski;

said wheel being disposed inside of said opening in the front of said ski.

4. The invention according to claim 3 further comprising frame mounting means by which said frame is rotatably mounted to said rear end of said base structure.

5. Then invention according to claim 4 in which said frame mounting means comprises a first collar member rigidly attached to the bottom of said frame; and a first axial member rididly attached to the front end of said base structure; and said first collar member encircles said axial member.

6. The invention according to claim 5 in which said locking means comprises a moveable locking pin;

a locking pin housing disposed in said frame; and a locking pin strike member disposed in the rear of said base structure.

7. The invention according to claim 6 further comprising a handle mounting means; said handle mounting means comprising a second axial member rigidly attached to said frame;

a second collar member rigidly attached to said handle; and said second collar member is rotatably mounted upon said second axial member.

8. The invention according to claim 7 in which said handle comprises a handle stem;

said handle stem being an elongated member;

one end of said handle stem being attached to said second collar member;

said frame comprises a first collar support member intermediately disposed between said top of said frame and said bottom of said frame; and said second axial member being rigidly attached to said first collar support member.

9. A manually operated hand cart comprising:

at least one ski;

said ski having a nominally smooth underside;

the rear end of said underside of said ski being in a first plane; and the front end of said underside of said ski being at an acute angle to said first plane;

at least one wheel;

said wheel being rotatably mounted onto said front end of said ski, respectively;

a base structure rigidly attached to the top of said ski;

said base structure having a front end and a rear end corresponding to said front end and said rear end of said ski, respectively;

a frame having a top end and a bottom end;

said frame being rotatably mounted to said front end of said base structure at said bottom end of said frame;

a handle means connected with said top end of said frame by which handle means the hand cart may be pulled; and locking means by which the position of said frame relative to said base structure may be temporarily fixed in the upright position.

* * * * *